(12) United States Patent
Chen et al.

(10) Patent No.: US 9,788,654 B1
(45) Date of Patent: Oct. 17, 2017

(54) DRAWER SLIDE RAIL

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Hsiu-Chiang Liang, Kaohsiung (TW); Fang-Cheng Su, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 0 days.

(21) Appl. No.: 15/268,779

(22) Filed: Sep. 19, 2016

(30) Foreign Application Priority Data

May 31, 2016 (TW) .............................. 105117123 A

(51) Int. Cl.
| | | |
|---|---|---|
| *A47B 88/04* | (2006.01) |
| *A47B 88/12* | (2006.01) |
| *F16C 29/00* | (2006.01) |

(52) U.S. Cl.
CPC .......... *A47B 88/0407* (2013.01); *A47B 88/12* (2013.01); *F16C 29/001* (2013.01); *A47B 2210/0054* (2013.01); *F16C 2314/72* (2013.01)

(58) Field of Classification Search
CPC .... A47B 88/12; A47B 88/0407; F16C 29/001
USPC ......... 312/330.1, 334.1, 334.4, 334.6, 334.7, 312/334.8
See application file for complete search history.

(56) References Cited

U.S. PATENT DOCUMENTS

| | | | | |
|---|---|---|---|---|
| 3,119,643 A * | 1/1964 | Levi ..................... | A47B 88/483 |
| | | | 312/334.19 |
| 5,823,648 A * | 10/1998 | Domenig ............... | A47B 88/43 |
| | | | 312/334.5 |
| 6,367,900 B1 * | 4/2002 | Woerner ................ | A47B 88/43 |
| | | | 312/334.1 |
| 7,988,246 B2 * | 8/2011 | Yu ......................... | A47B 88/43 |
| | | | 211/175 |
| 8,052,234 B2 | 11/2011 | Liang et al. | |
| 2001/0019235 A1 * | 9/2001 | Hammerle .......... | A47B 88/427 |
| | | | 312/334.4 |
| 2009/0236959 A1 * | 9/2009 | Liang ................... | A47B 88/427 |
| | | | 312/334.4 |

\* cited by examiner

*Primary Examiner* — James O Hansen
(74) *Attorney, Agent, or Firm* — Rosenberg, Klein & Lee

(57) ABSTRACT

A drawer slide rail includes a longitudinal body and a base. The longitudinal body includes a pair of first sidewalls extending respectively from two sides of a front end portion of the longitudinal body and a pair of second sidewalls respectively connected to the first sidewalls and extending respectively from two sides of the longitudinal body. The base is mounted on the front end portion of the longitudinal body and includes first to third supporting arms. The first supporting arm is pressed against a bottom portion of one of the first sidewalls. The second supporting arm is pressed against a bottom portion of one of the second sidewalls. The third supporting arm is pressed against a lateral portion of one of the second sidewalls.

4 Claims, 5 Drawing Sheets

DRAWER SLIDE RAIL

FIELD OF THE INVENTION

The present invention relates to a drawer slide rail and more particularly to a drawer slide rail with a reinforced supporting structure.

BACKGROUND OF THE INVENTION

U.S. Pat. No. 8,052,234 B2, granted to the inventor of the present invention, discloses a fixture (or base) 200 mounted at the front end of a rail member 110. The base 200 has a supporting member 300, whose height relative to the rail member 110 can be changed in order to adjust the gap between the drawer on the rail member 110 and the cabinet where the drawer is mounted.

While the foregoing design allows users to adjust the gap between the drawer and the cabinet with ease, the base 200 is not mounted on the rail member 110 securely enough to provide the desired structural strength.

To address the aforesaid issue, the present invention was developed as an improvement of the prior art.

SUMMARY OF THE INVENTION

The present invention relates to a drawer slide rail with a reinforced supporting structure.

According to one aspect of the present invention, a drawer slide rail includes a longitudinal body, a pair of first sidewalls, a pair of second sidewalls, and a base. The first sidewalls extend respectively from two sides of a front end portion of the longitudinal body. The second sidewalls are respectively connected to the first sidewalls and extend to a rear end portion of the longitudinal body. The first sidewalls have a first height, and the second sidewalls have a second height greater than the first height. The base is mounted on the front end portion of the longitudinal body and includes a first supporting arm, a second supporting arm, and a third supporting arm. The first supporting arm of the base has a side pressed against a portion of a bottom portion of one of the first sidewalls of the longitudinal body. The second supporting arm of the base is pressed against a portion of a bottom portion of one of the second sidewalls of the longitudinal body. The third supporting arm of the base is pressed against a lateral portion of one of the second sidewalls of the longitudinal body.

Preferably, the base has a supporting member, and the longitudinal body has an opening corresponding in position to the supporting member of the base. The supporting member is configured to extend through the opening so that the supporting position of the supporting member can be adjusted with respect to the longitudinal body.

Preferably, the base has a first rack, and the supporting member extends from the base and has a second rack. A portion of the second rack lies in a different plane from the plane where the first rack lies. An adjusting member movably meshes with the first rack and the second rack so that the supporting member can extend through the opening, allowing the supporting position of the supporting member to be adjusted with respect to the longitudinal body.

Preferably, the first supporting arm of the base further has another side pressed against an end portion of one of the second sidewalls of the longitudinal body.

Preferably, the base is formed of plastic.

DETAILED DESCRIPTION OF THE INVENTION

Figure 1:
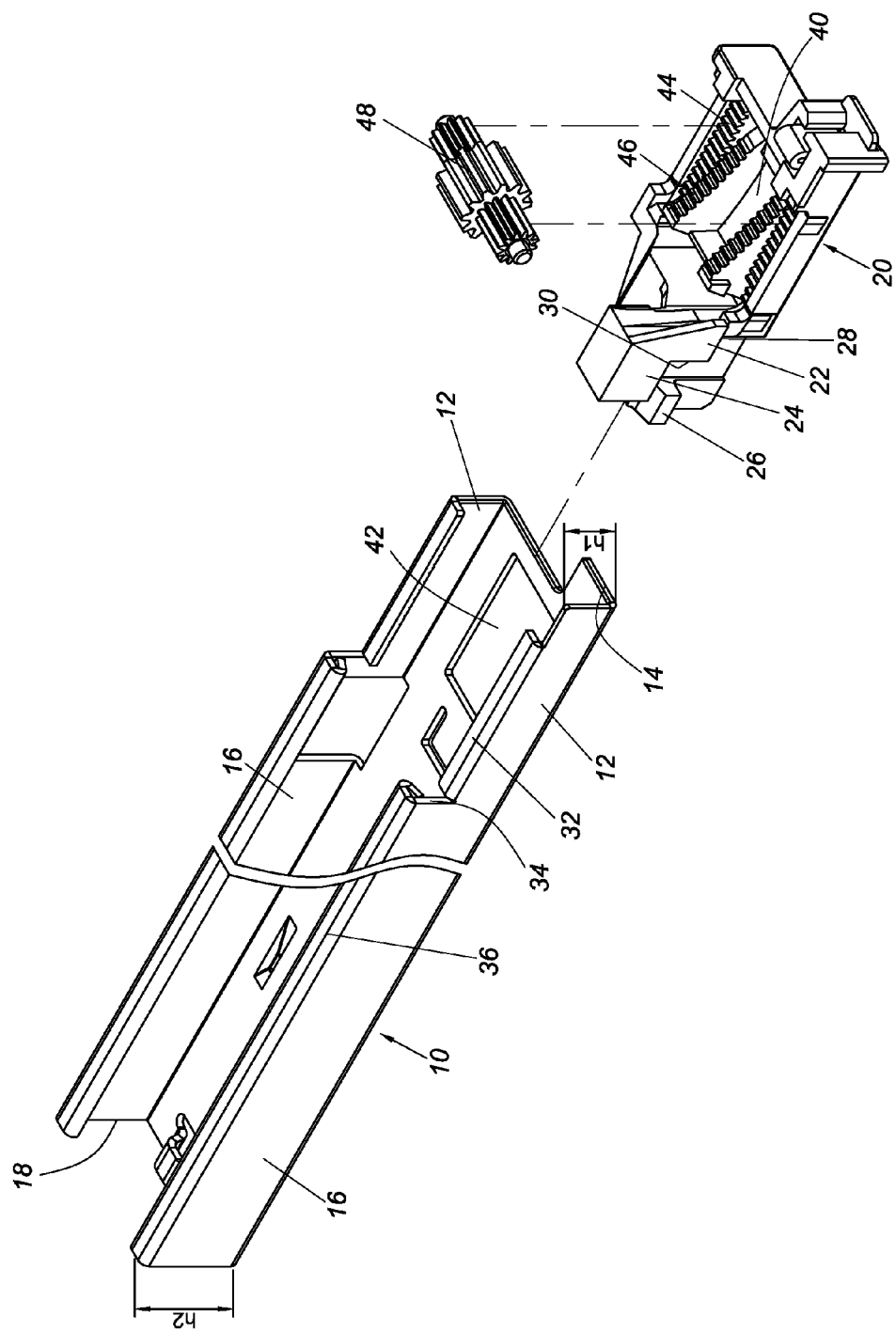
FIG. 1 is an exploded perspective view of the drawer slide rail in an embodiment of the present invention.
Figure 2:
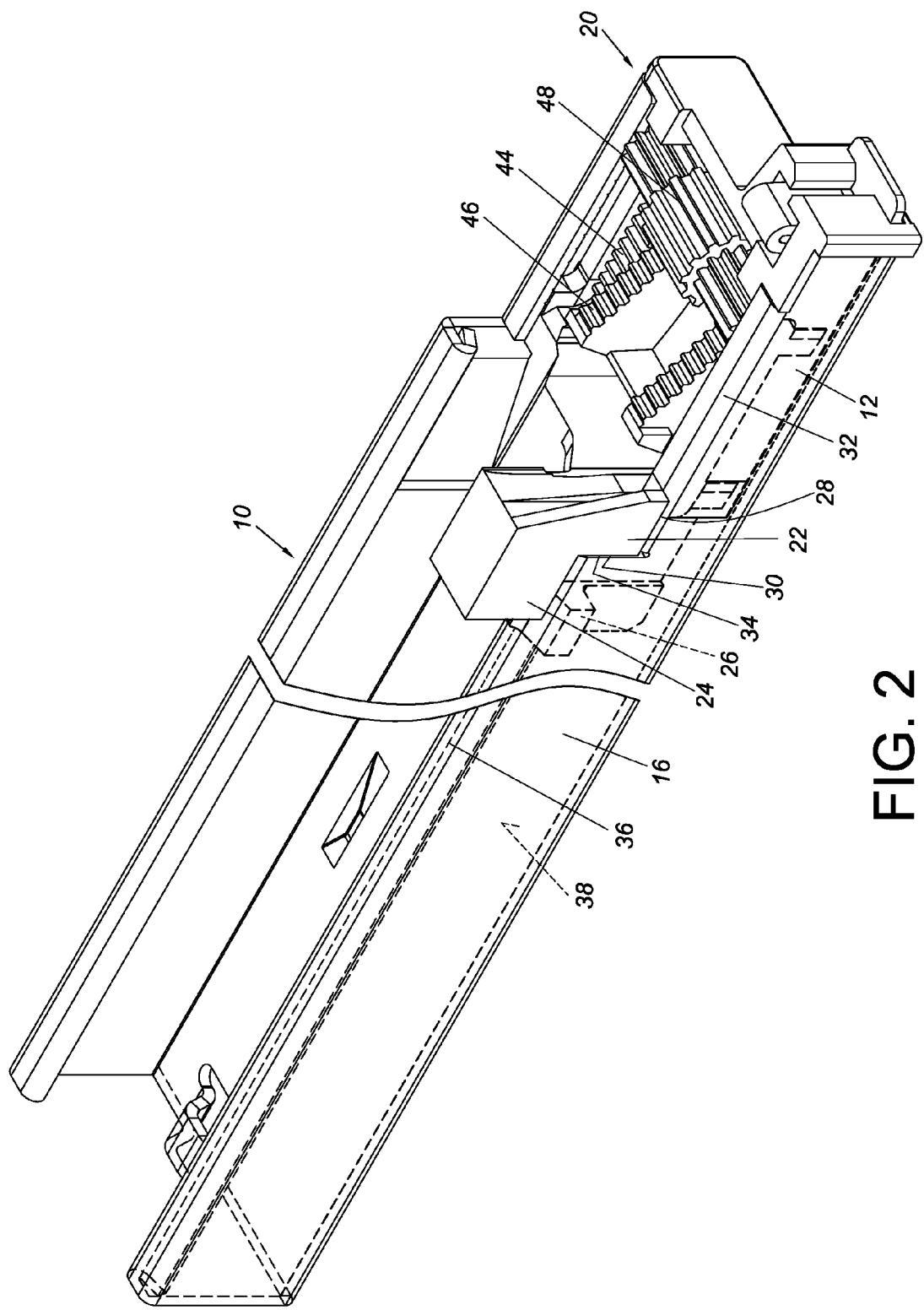
FIG. 2 is an assembled perspective view of the drawer slide rail in FIG. 1.
Figure 3:
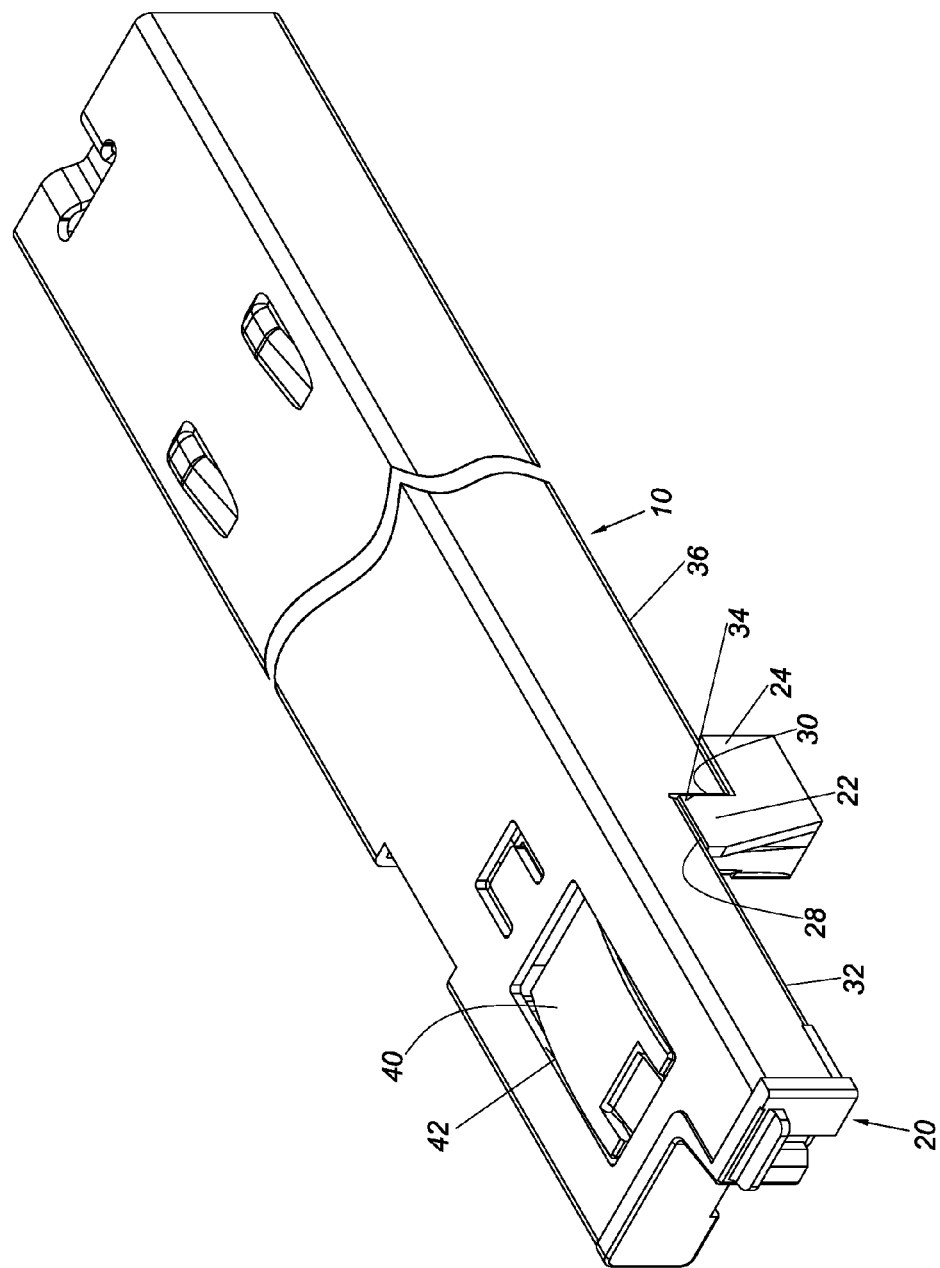
FIG. 3 is another assembled perspective view of the drawer slide rail in FIG. 1 and is taken from a different viewpoint from that of FIG. 2.

Referring to FIG. 1 to FIG. 3, the drawer slide rail according to an embodiment of the present invention includes a longitudinal body 10, a pair of longitudinal first sidewalls 12, and a pair of longitudinal second sidewalls 16. The pair of longitudinal first sidewalls 12 extend respectively from two sides of a front end portion 14 of the longitudinal body 10. The pair of longitudinal second sidewalls 16 are respectively connected to the first sidewalls 12 and extend respectively from two sides of the longitudinal body 10 to a rear end portion 18 of the longitudinal body 10. The first sidewalls 12 have a first height h1, and the second sidewalls 16 have a second height h2 greater than the first height h1.

In this embodiment, the drawer slide rail further includes a base 20 mounted on the front end portion 14 of the longitudinal body 10. The base 20 includes a first supporting arm 22, a second supporting arm 24, and a third supporting arm 26. The first supporting arm 22 of the base 20 has a first side 28 and a second side 30.

Once the base 20 is mounted on the longitudinal body 10, the first side 28 of the first supporting arm 22 of the base 20 is pressed against a portion of a bottom portion 32 of one of the first sidewalls 12 of the longitudinal body 10, the second side 30 of the first supporting arm 22 of the base 20 is pressed against an end portion 34 of one of the second sidewalls 16 of the longitudinal body 10, the second supporting arm 24 of the base 20 is pressed against a portion of a bottom portion 36 of one of the second sidewalls 16 of the longitudinal body 10, and the third supporting arm 26 of the base 20 is pressed against a portion of an inner lateral side 38 of one of the second sidewalls 16 of the longitudinal body 10.

In a preferred embodiment, the base 20 has a supporting member 40, and the longitudinal body 10 has an opening 42 corresponding in position to the supporting member 40 of the base 20. The supporting member 40 is configured to extend through the opening 42 so that the supporting position of the supporting member 40 can be adjusted in relation to the longitudinal body 10.

In a preferred embodiment, the base 20 has a first rack 44, and the supporting member 40 extends from the base 20 and has a second rack 46. A portion of the second rack 46 lies in a different plane from the plane where the first rack 44 is located. For instance, a portion of the second rack 46 is inclined with respect to the first rack 44. In addition, an adjusting member 48 movably meshes with the first rack 44 and the second rack 46.

Figure 4:
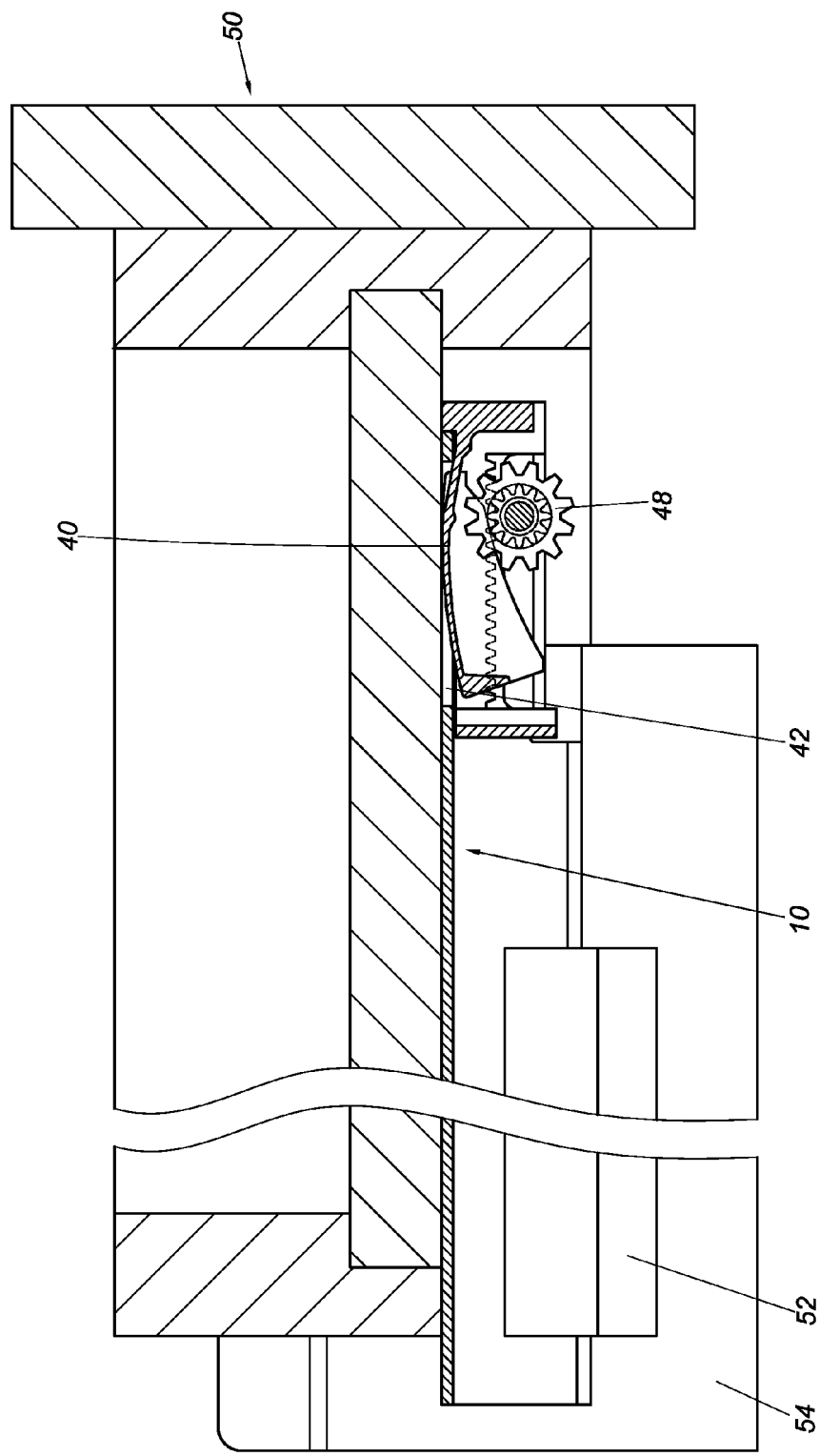
FIG. 4 schematically illustrates how the drawer slide rail in FIG. 1 is mounted in a drawer system, showing the supporting member at a first position.
Figure 5:
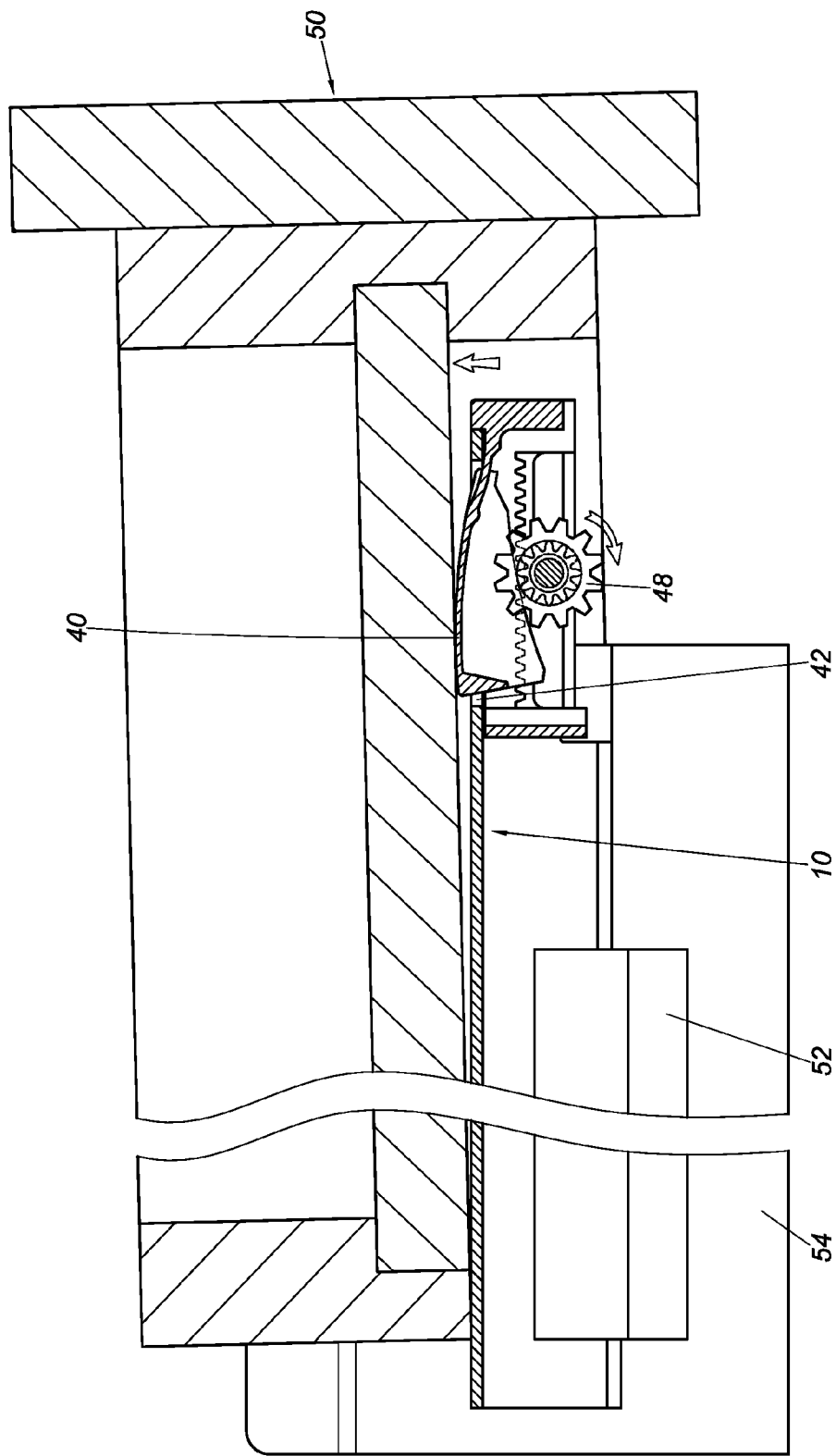
FIG. 5 is similar to FIG. 4, except that the supporting member has been adjusted to a second position.

In terms of application, the drawer slide rail can be mounted in a drawer system which, as shown in FIG. 4 and FIG. 5, includes a drawer 50 and a stationary rail 52 mounted in a cabinet 54. Once mounted in the drawer system, the longitudinal body 10 of the drawer slide rail can be pulled out of and pushed back into the cabinet 54 with respect to the stationary rail 52. Through the adjusting member 48, the supporting position of the supporting member 40 can be adjusted with respect to the longitudinal body 10 so as to adjust the gap between the drawer 50 and the cabinet 54 while the drawer 50 is being mounted.

In a preferred embodiment, the base 20 is formed of plastic.

According to the above, the base 20 can be mounted firmly on the longitudinal body 10 to reinforce the supporting structure of the drawer slide rail.

While the present invention has been disclosed through the foregoing preferred embodiments, it is understood that the embodiments are not intended to be restrictive of the scope of the invention. The scope of patent protection sought by the applicant is defined by the appended claims.

What is claimed is:

1. A drawer slide rail, comprising:
   a longitudinal body;
   a pair of first sidewalls extending respectively from two sides of a front end portion of the longitudinal body;
   a pair of second sidewalls respectively connected to the first sidewalls and extending to a rear end portion of the longitudinal body, wherein the first sidewalls have a first height, and the second sidewalls have a second height greater than the first height; and
   a base mounted on the front end portion of the longitudinal body, the base including a supporting member, a first supporting arm, a second supporting arm, and a third supporting arm, wherein the first supporting arm of the base has a side pressed against a portion of a bottom portion of one of the first sidewalls of the longitudinal body, the second supporting arm of the base is pressed against a portion of a bottom portion of one of the second sidewalls of the longitudinal body, and the third supporting arm of the base is pressed against a lateral portion of one of the second sidewalls of the longitudinal body, and wherein the longitudinal body includes an opening corresponding in position to the supporting member of the base, and the supporting member is configured to extend through the opening so that a supporting position of the supporting member is adjustable with respect to the longitudinal body.

2. The drawer slide rail of claim 1, wherein the base includes a first rack, the supporting member extends from the base and includes a second rack, the second rack has a portion lying in a different plane from a plane where the first rack lies, and an adjusting member movably meshing with both the first rack and the second rack enables the supporting member to extend through the opening so that the supporting position of the supporting member is adjustable with respect to the longitudinal body.

3. The drawer slide rail of claim 1, wherein the first supporting arm of the base further has another side pressed against an end portion of one of the second sidewalls of the longitudinal body.

4. The drawer slide rail of claim 1, wherein the base is formed of plastic.

* * * * *